(12) United States Patent
Baldauf

(10) Patent No.: US 9,906,005 B2
(45) Date of Patent: Feb. 27, 2018

(54) DEVICE FOR PROCESSING AN END OF A CABLE

(71) Applicant: ROSENBERGER HOCHFREQUENZTECHNIK GMBH & CO. KG, Fridolfing (DE)

(72) Inventor: Walter Baldauf, Fridolfing (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 195 days.

(21) Appl. No.: 14/437,230

(22) PCT Filed: Oct. 14, 2013

(86) PCT No.: PCT/EP2013/003087
§ 371 (c)(1),
(2) Date: Apr. 21, 2015

(87) PCT Pub. No.: WO2014/063794
PCT Pub. Date: May 1, 2014

(65) Prior Publication Data
US 2015/0288153 A1 Oct. 8, 2015

(30) Foreign Application Priority Data

Oct. 23, 2012 (DE) .................. 10 2012 020 798

(51) Int. Cl.
*H02G 1/12* (2006.01)
(52) U.S. Cl.
CPC ......... *H02G 1/1297* (2013.01); *H02G 1/1256* (2013.01); *Y10T 29/49123* (2015.01)

(58) Field of Classification Search
CPC .......... B21F 5/00; B21F 27/14; H01B 13/016; H01B 13/0165; H01B 13/0167; H02G 1/1256; H02G 1/1297; Y10T 29/49123
See application file for complete search history.

(56) References Cited

U.S. PATENT DOCUMENTS 3,621,560 A * 11/1971 Bright .................... H01R 43/00
81/9.51
3,721,138 A * 3/1973 Kamimura ............. H02G 1/127
81/9.51
4,719,697 A 1/1988 Schwartzman et al.
(Continued)

FOREIGN PATENT DOCUMENTS

DE 2043644 A1 3/1971
DE 60204369 T2 3/2006
(Continued)

*Primary Examiner* — Carl Arbes
(74) *Attorney, Agent, or Firm* — DeLio, Peterson & Curcio, LLC; Robert Curcio

(57) ABSTRACT

A method for the automated processing of an end of a cable, which has an inner part and a sleeve surrounding the inner part, wherein one section of the sleeve is radially widened. The radially widened section of the sleeve is severed by the exertion of an axial cutting force in one region. A device suitable for implementing this method for the radial widening of a section of the sleeve and a cutting device having a first cutting body and a second cutting body, which can be moved toward each other in the axial direction with respect to the cable end and, as a result, sever the radially widened section of the sleeve in one region.

14 Claims, 4 Drawing Sheets

(56) References Cited

U.S. PATENT DOCUMENTS

| | | | |
|---|---|---|---|
| 6,536,103 B1 | 3/2003 | Holland | |
| 6,776,196 B2 * | 8/2004 | Yamakawa | H01R 43/28 29/828 |
| 7,395,592 B2 * | 7/2008 | Matsumura | H01R 43/28 29/33 F |
| 7,467,463 B2 * | 12/2008 | Matsuoka | H01R 43/28 29/828 |
| 2002/0050062 A1 | 5/2002 | Sato | |
| 2007/0173122 A1 | 7/2007 | Matsuoka | |

FOREIGN PATENT DOCUMENTS

| | | |
|---|---|---|
| EP | 1054494 A2 | 10/2000 |
| JP | S5139358 B1 | 10/1976 |
| JP | H05-60123 U | 8/1993 |
| JP | 2001309522 A | 11/2001 |
| JP | 2012050169 A | 3/2012 |

* cited by examiner

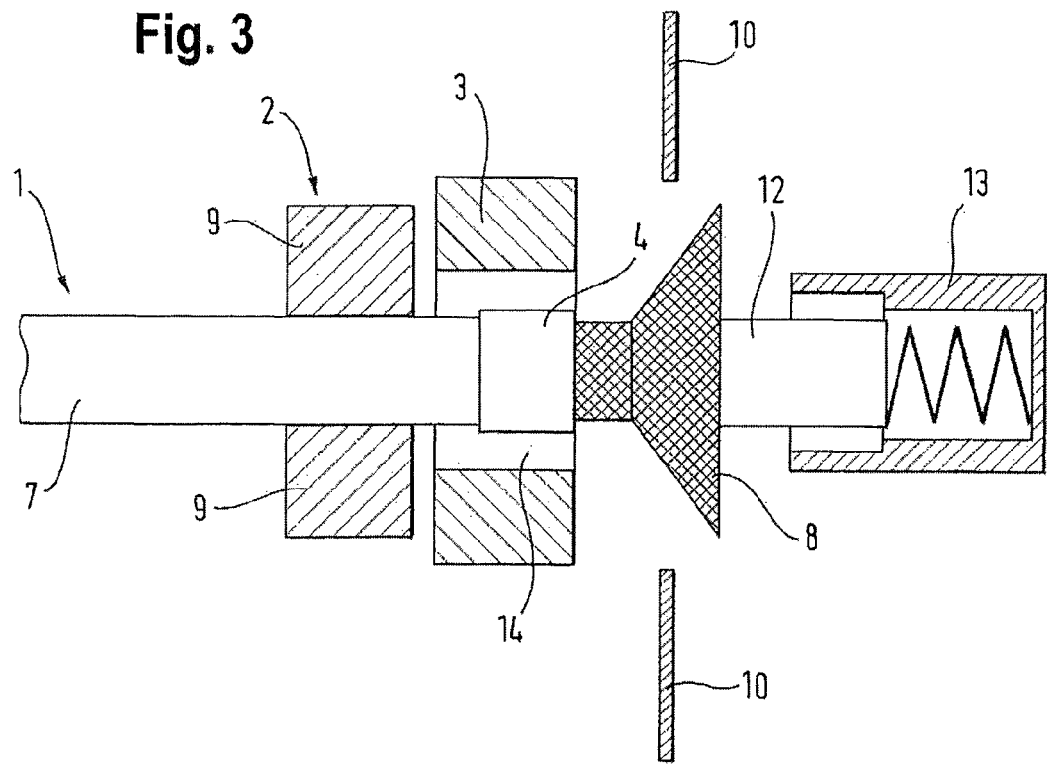
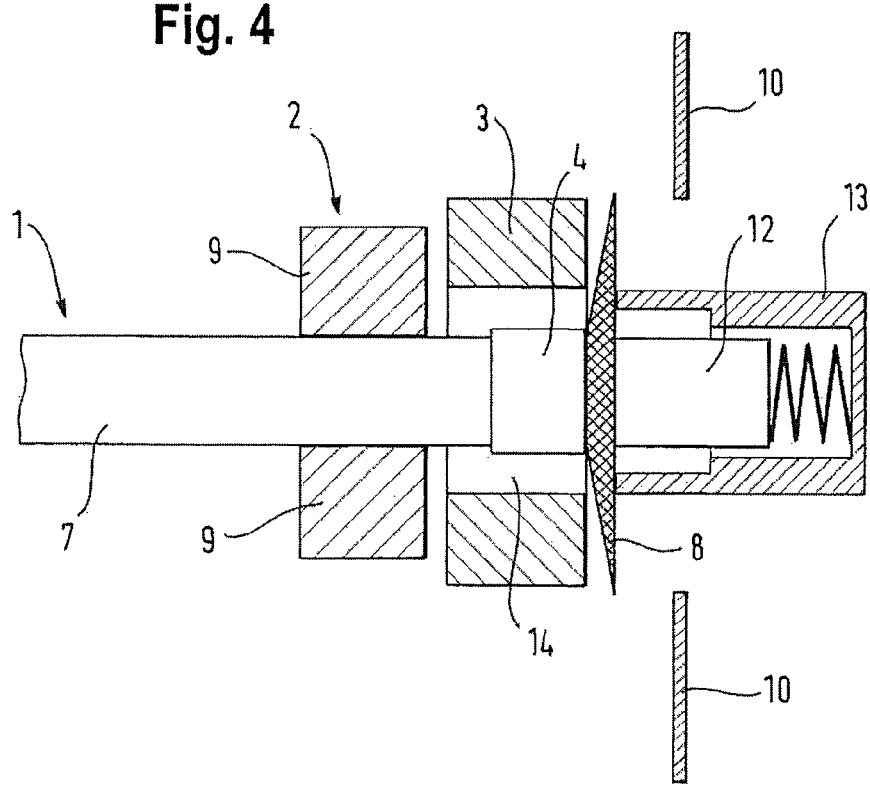

DEVICE FOR PROCESSING AN END OF A CABLE

BACKGROUND OF THE INVENTION

1. Field of the Invention

The invention relates to a device and a method for processing an end of a cable with an inner part and a sleeve surrounding the inner part, in particular a coaxial cable.

2. Description of Related Art

When cables are being assembled, the ends of cables are processed in order to prepare these for connection with, for example, a plug connector. In the case of coaxial cables this can involve exposing the inner conductor in one section of the end which is to be processed as well as exposing the outer conductor coaxially surrounding the inner conductor in a second section. For this purpose, as a rule a sheath surrounding the outer conductor is removed over the entire length of the end of the cable which is to be processed in order to expose the outer conductor. The outer conductor, which usually consists of a wire braid, is then folded back, accompanied by an initially radial widening, so that this lays against the sheath of the section adjacent the end of the cable which is to be processed. The insulating layer which insulates the inner conductor electrically from the outer conductor is then removed in one section or over the entire length of the end of the cable which is to be processed, thus exposing the inner conductor.

A connection can then be made with, for example, a coaxial plug connector, wherein an inner conductor part of the coaxial plug connector is connected electrically and mechanically, for example crimped together, with the exposed inner conductor section of the cable. At the same time, an outer conductor part of the coaxial plug connector can be connected electrically with the outer conductor, for example, in that the outer conductor part is pushed onto the folded-back section of the outer conductor and pressed radially, for example crimped, against the underlying section of the sheath.

In many cases the length of the folded-back section of the outer conductor should be shorter than the end of the cable which is to be processed, so that this is shortened by trimming in a further working step.

A device suitable for this purpose as well as a corresponding method are known from U.S. Pat. No. 4,719,697 issued to Schwartzman, et al., on Jan. 19, 1988, titled "METHOD OF PREPARING COAXIAL CABLE FOR TERMINATION." Here, the end of a coaxial cable is, by automated means, prepared for connection with a coaxial plug connector and simultaneously also connected with this. For this purpose, the sheath, the outer conductor and the insulating layer of the cable in one section of the end which is to be processed are first removed by means of a cutting device, thus exposing the inner conductor. The sheath in a further section of the end which is to be processed is then removed by means of said cutting device in order to expose the outer conductor braid in this section. A first radial widening of the exposed outer conductor braid then takes place in that a wheel in the vicinity of the cable-side end of the exposed outer conductor braid is pressed radially into this and in this position is rolled around the fixed cable. This results in the outer conductor braid being pressed locally into the insulating layer, which is associated with a widening of the free ends of the exposed outer conductor braid. This widening is then enlarged through further measures, including the axial insertion of an expanding mandrel. An outer conductor part of the plug connector is then pushed into the resulting gap between outer conductor braid and insulating layer and the widened outer conductor braid is then pressed against the outer side of the outer conductor part by means of a sleeve. This creates an electrical and mechanical connection between the outer conductor of the cable and the outer conductor part of the coaxial plug connector. The method according to U.S. Pat. No. 4,719,697 does not provide for a folding-back or a shortening of the widened outer conductor braid.

SUMMARY OF THE INVENTION

Bearing in mind the problems and deficiencies of the prior art, it is therefore an object of the present invention to provide a device and method for processing cables where, in order to reduce costs, the aim is to automate the assembly of cables as far as possible, so that the described processing of the ends of the cable is to be automated.

The above and other objects, which will be apparent to those skilled in the art, are achieved in the present invention which is directed to a device for processing the end of a cable with an inner part and a sleeve surrounding the inner part, such that a section of the sleeve is radially widened, comprising: a cutting device having a first cutting body and a second cutting body which can be moved towards one another in the axial direction with respect to the cable end, thus severing the radially widened section of the sleeve in one region, the second cutting body having an opening, wherein the first cutting body penetrates into the opening of the second cutting body, cutting through the sleeve; a foldback tube axially insertable into a gap between the radially widened section of the sleeve and the inner part for bending over the section of the sleeve, wherein the foldback tube is connected, in a spring-loaded manner, with the first cutting body and is inserted into the gap through an axial movement of the first cutting body until the foldback tube reaches an axial stop, and a further movement of the first cutting body takes place in a movement relative to the foldback tube.

The first cutting body is preferably tubular in form and slideable over the section of the cable adjacent the end which is to be processed, such that, following the severing action, the first cutting body folds back the remaining radially widened section of the sleeve.

The device includes a supporting sleeve surrounding the cable and limiting the section which is to be radially widened, and a nipper which presses the section of the sleeve which is to be radially widened locally into the inner part of the cable.

The device further includes a severing device for severing an outer layer of the inner part and/or an outer layer of the outer part of the cable.

In a second aspect, the present invention is directed to a method for the automated processing of an end of a cable with an inner part and a sleeve surrounding the inner part with a device for processing the end of a cable with an inner part and a sleeve surrounding the inner part, such that a section of the sleeve is radially widened, the device including a cutting device having a first cutting body and a second cutting body which can be moved towards one another in the axial direction with respect to the cable end, thus severing the radially widened section of the sleeve in one region, the second cutting body having an opening, wherein the first cutting body penetrates into the opening of the second cutting body, cutting through the sleeve; and a foldback tube axially insertable into the a gap between the radially widened section of the sleeve and the inner part for bending over the section of the sleeve, wherein the foldback tube is connected, in a spring-loaded manner, with the first cutting body and is inserted into the gap through an axial movement of the first cutting body until the foldback tube reaches an axial stop, and a further movement of the first cutting body takes place in a movement relative to the foldback tube; the method including radially widening one section of the sleeve, and severing the radially widened section of the sleeve in one region through the application of an axial cutting force.

The method also includes removing an outer layer of the sleeve prior to the radial widening of an inner layer of the sleeve in the section of the sleeve which is to be radially widened.

The method also includes removing an outer layer of the inner part from an inner layer of the inner part following a radial widening of the section of the sleeve, and exposing a corresponding section of the inner part.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 3 depicts a foldback tube inserted into a gap between the outer conductor braid and an insulating layer of the coaxial cable in order to bend over the radially widened part of the outer conductor braid;

FIG. 4 depicts the insertion of the foldback tube of FIG. 3 into the radially widened outer conductor braid until the foldback tube comes to rest, with the corresponding section of the outer conductor braid intervening against the supporting sleeve;

DESCRIPTION OF THE PREFERRED EMBODIMENT(S)

Figure 1:
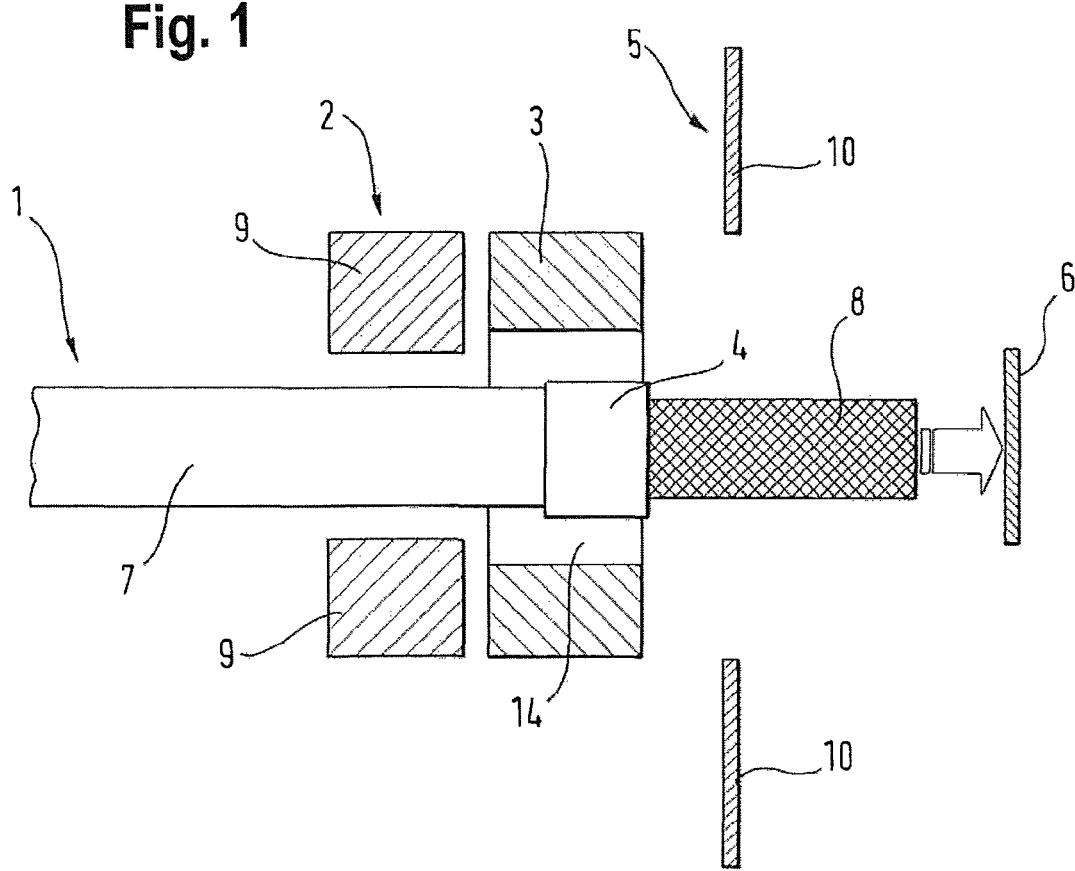
FIG. 1 depicts a coaxial cable, the end of which is to be processed, pushed in an axial direction into a device according to the invention.

In describing the preferred embodiment of the present invention, reference will be made herein to FIGS. 1-8 of the drawings in which like numerals refer to like features of the invention.

Starting out from this prior art, the invention is based on the problem of further improving a method of the generic type for the automated processing of cable ends, as known, for example, from U.S. Pat. No. 4,719,697, and in particular to add the possibility of an automated shortening of the radially widened section of the outer conductor.

This problem is solved by means of a device and a method according to the description herein and embodied in the claims. Advantageous embodiments of the device according to the invention and of the method according to the invention are the subject matter of the claims and are explained in the following description of the invention.

A device according to the invention for processing the end of a cable with an inner part and a sleeve surrounding the inner part comprises at least a method and apparatus for the radial widening of a section of the sleeve (or of a part thereof) and a cutting device with (at least) a first and a second cutting body which can be moved towards one another in the axial direction with respect to the cable end, as a result severing the radially widened section of the sleeve in one region.

A corresponding (automated) method for the processing of an end of a cable with an inner part and a sleeve surrounding the inner part involves a section of the sleeve (or of a part thereof) being radially widened and the radially widened section of the sleeve being severed through the application of an axial (in relation to the longitudinal axis of the cable in the end which is to be processed) cutting force in one region.

According to the invention, "radially widening" is understood to refer to an (elastic or plastic) spreading-out of the section of the sleeve such that this section at least partially extends in a radial direction (not necessarily perpendicularly) to the longitudinal axis of the cable end.

A significant advantage of the device according to the invention and of the method according to the invention is that the severing of the sleeve can take place simultaneously with the radial widening or further folding over. As a result, the period of time required for the processing of a cable end is not extended, or not significantly extended, despite the additional shortening of the sleeve.

The cable which is to be processed is preferably a coaxial cable which at least comprises (at least) one inner conductor and (at least) one outer conductor surrounding the inner conductor as well as (at least) one insulating layer electrically insulating the inner conductor from the outer conductor. In addition, (at least) one sheath surrounding the outer conductor is preferably also provided. In this case the inner part of the coaxial cable can comprise the inner conductor and the insulating layer and the sleeve of the outer conductor and the sheath, wherein preferably only the outer conductor is radially widened and if necessary bent over (in particular folded back), while the sheath in the corresponding section has been removed previously.

Accordingly, in a preferred embodiment of the method according to the invention an outer layer (in particular a sheath of a coaxial cable) of the sleeve can be removed prior to the radial widening of an inner layer (in particular of an outer conductor of the coaxial cable) of the sleeve in the section of the sleeve which is to be radially widened. The device according to the invention can possess a corresponding severing device for this purpose.

The outer conductor of the coaxial cable is preferably designed in the form of a braid, since such an outer conductor braid is relatively easy to widen radially and if necessary bend over and fold back. However, the processing of a coaxial cable according to the invention is also possible with a solid outer conductor or other possibly solid sleeve, with elastic and/or plastic deformation and possibly a tearing of the outer conductor or the sleeve in the section which is to be radially widened.

Preferably, the radial widening of the section of the sleeve can be effected through the application of radial (inwardly directed) forces in a partial region of the section. For this purpose, the device according to the invention can preferably include a nipper which thus presses the section of the sleeve which is to be bent over into the inner part of the cable in this partial region.

In a preferred embodiment of the device according to the invention it can be the case that the first cutting body is inserted into an opening of the second cutting body, severing the sleeve. This represents a particularly simple constructive design of an axially-acting cutting device.

It can also be the case that the first cutting body is sleeve-formed in design and, following the severing action, further bends over and in particular folds back the remaining radially widened section of the sleeve by sliding over the section of the cable adjacent the end which is to be processed.

In a preferred embodiment of the device according to the invention it can be the case that the radially widened section of the sleeve is, through the application of axial forces, bent over, i.e., further radially widened or folded back (beyond the perpendicular (in relation to the original orientation) orientation). This take place before or after the severing of the radially widened section. For this purpose, the device according to the invention can comprise a foldback tube which can be inserted axially into the gap formed between the radially widened section of the sleeve and the inner part in order to bend over the radially widened section of the sleeve.

In one embodiment of the device according to the invention it can be the case that the foldback tube is connected, in a spring-loaded manner, with the first cutting body, wherein the foldback tube is inserted into the gap through an axial movement of the first cutting body until the foldback tube reaches an axial stop and a further movement of the first cutting body takes place (tensioning the spring) in a movement relative to the foldback tube. This makes it possible for the part of the sleeve which is to be bent over to be brought into a position favorable for the severing action (for example with an orientation perpendicular to the longitudinal axis of the end of the cable which is to be processed) by means of the foldback tube. A further bending over (in particular folding back) of the remaining radially widened section of the sleeve following the severing action can then be effected by means of the first cutting body.

A supporting sleeve surrounding the cable in the section adjacent the end which is to be processed and limiting the section which is to be radially widened can serve as the axial stop for the foldback tube. Alternatively, however, the end face of a previously trimmed outer layer (in particular a sheath of a coaxial cable) of the sleeve can serve as the axial stop. The supporting sleeve can also perform other functions and in particular can serve to position the end of the cable which is to be processed.

In order to achieve the greatest possible degree of automation of the processing of the cable end, the device according to the invention can also comprise (at least) one position sensor which detects a defined position of the end of the cable which is to be processed within the device. A control device can then initiate the processing of the end of the cable.

Finally, in the method according to the invention, following the radial widening of the section of the sleeve and the resulting exposure of a corresponding section of the inner part, an outer layer (in particular an insulating layer of a coaxial cable) of the inner part can be removed in order to expose an inner layer (this can also be a core, such as, in particular, an inner conductor of a coaxial cable) of the inner part. For this purpose, the device according to the invention can possess a corresponding severing device, which can in particular also be the same severing device which is also used to remove an outer layer of the sleeve.

The invention is described in more detail in the following with reference to an exemplary embodiment. In the drawings, FIGS. 1 to 8 show different steps of a method according to the invention as well as components of the device according to the invention used therein in diagrammatic form.

FIG. 1 shows how a coaxial cable 1, the end of which is to be processed, is pushed in an axial direction into a device according to the invention. The coaxial cable 1 is thereby passed through corresponding openings or gaps in a clamping device 2, a (second) cutting tool 3, a supporting sleeve 4 and a nipper 5. A position sensor 6 detects when the cable end has reached a predefined position within the device and then, controlled by a control device (not shown), the coaxial cable 1 is processed fully automatically by means of the device.

The coaxial cable 1 shown here was prepared for processing in that its sheath 7 was removed in the section which is to be processed, thus exposing an outer conductor braid 8 of the coaxial cable 1 in this section. Through a slight modification of the method described here, this exposure of the outer conductor braid 8 can also be performed automatically by the device shown here, as will be explained later.

Figure 2:
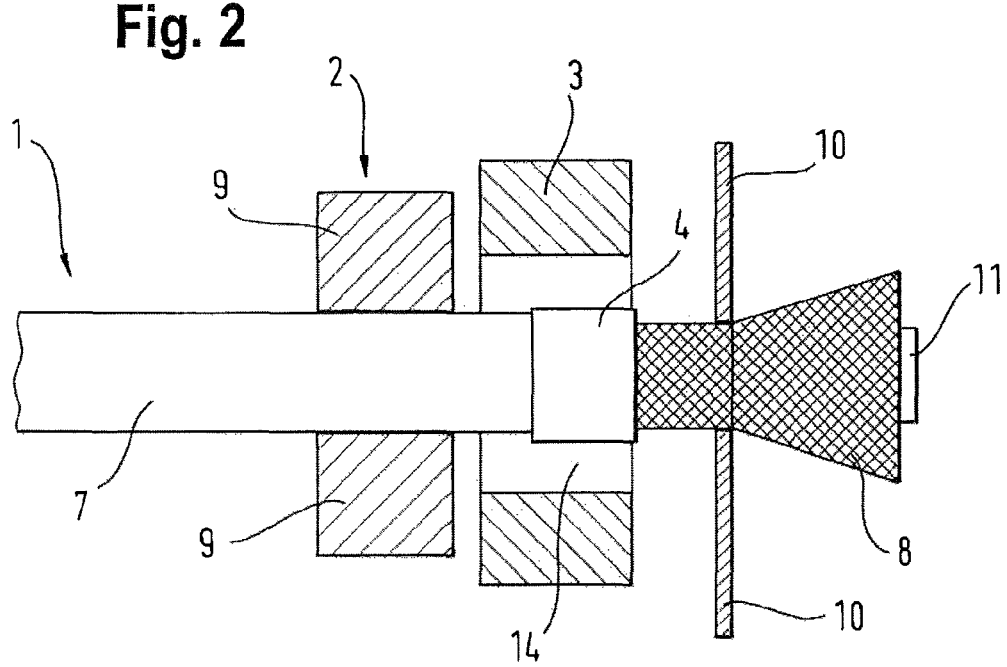
FIG. 2 depicts: a) a fixing of the coaxial cable of FIG. 1 by a clamping device having clamping jaws which are moved radially together for this purpose (in relation to the longitudinal axis of the cable); and b) the radial widening of the exposed outer conductor braid.

FIG. 2 shows, on the one hand, a fixing of the coaxial cable 1 by means of the clamping device 2, the clamping jaws 9 of which are moved radially together for this purpose (in relation to the longitudinal axis of the cable). The coaxial cable 1 or at least its end which is to be processed is thereby secured, primarily axially but also against rotation.

FIG. 2 also shows the radial widening of the exposed outer conductor braid 8. For this purpose, two nipper elements 10 of the nipper 5 are moved together radially (in relation to the longitudinal axis of the cable), as a result of which the outer conductor braid 8, in a partial region of the exposed section, which is positioned at a distance from the free end of the coaxial cable 1 or of the outer conductor braid 8 and preferably as close as possible to the supporting sleeve 4, is pressed a certain distance into the insulating layer of the coaxial cable lying beneath the outer conductor braid. This leads to a local (substantially plastic) deformation of the individual wires of the outer conductor braid 8 and as a result to a radial widening of the outer conductor braid 8 in the section between the nipper elements 10 and the free end of the outer conductor braid 8. This forms a funnel-shaped widened gap between the outer conductor braid 8 and an insulating layer 11 of the coaxial cable 1 in this section.

A foldback tube 12 can then be inserted into this gap in an axial direction in order to bend over the radially widened part of the outer conductor braid 8, i.e., first radially widening it further, as shown in FIG. 3. The nipper elements 10 have thereby already been moved back to their initial position in order not to obstruct the bending-over of the outer conductor braid 8. The foldback tube 12 is axially displaceable and guided, under spring pressure, in a guide of a (first) cutting tool 13. The movement of the foldback tube 12 is effected indirectly through a movement of the first cutting tool 13.

The foldback tube 12 is inserted into the radially widened outer conductor braid 8 until it comes to rest, with the corresponding section of the outer conductor braid 8 intervening, against the supporting sleeve 4. A further movement of the first cutting tool 13 then leads to a cushioning of the foldback tube, i.e., this remains stationary while the first cutting tool 13 is moved further (see FIG. 4).

As a result of this further movement, the first cutting tool 13 penetrates into an opening 14 in the second cutting tool 3. Due to the approximately equal diameters, (outer diameter of the first cutting tool 13 and inner diameter of the opening 14 of the second cutting tool 3), locally considerable shear forces are applied to a region of the radially widened outer conductor braid 8, as a result of which this is severed in the corresponding region (see FIG. 5).

Figure 5:
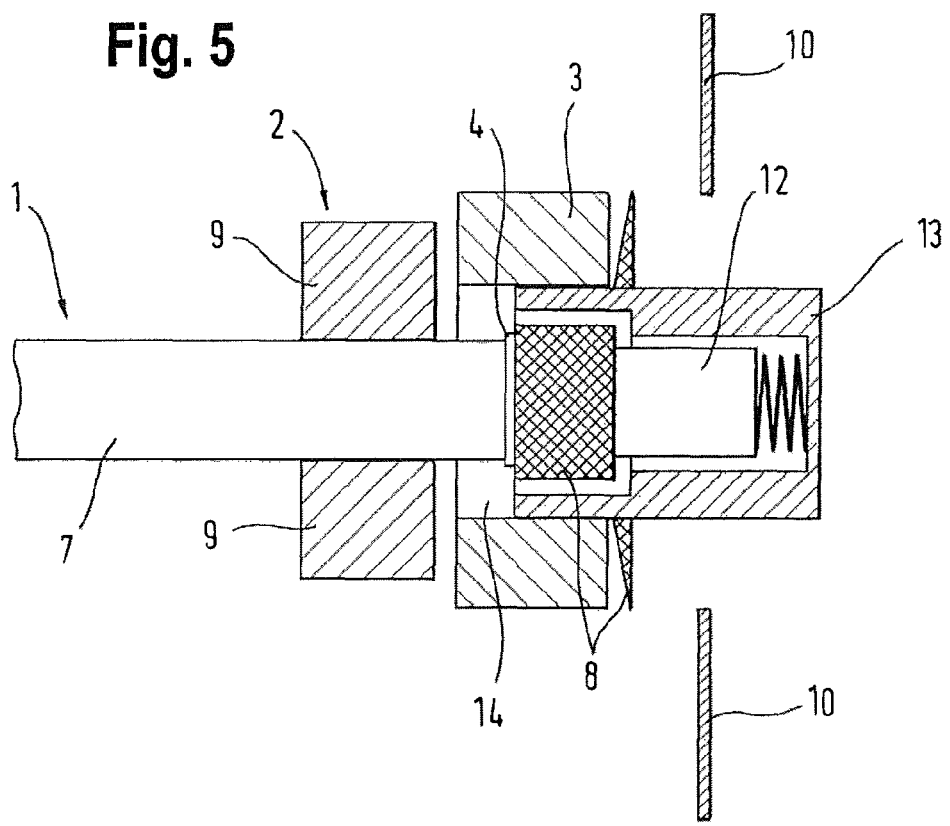
FIG. 5 depicts the first cutting tool penetrating into an opening in the second cutting tool, generating local shear forces to a region of the radially widened outer conductor braid, and severing a portion of the outer conductor braid.

FIG. 5 also shows that, after severing of the outer conductor braid 8 the first cutting tool 13 penetrates even further into the opening 14 of the second cutting tool 3. The front edge of the partially tubular-formed first cutting tool 13 thereby slides over the supporting sleeve 4, which leads to a further bending over and consequently a folding back of the remaining exposed outer conductor braid 8. This section thus extends in the opposite direction to its original orientation.

Figure 6:
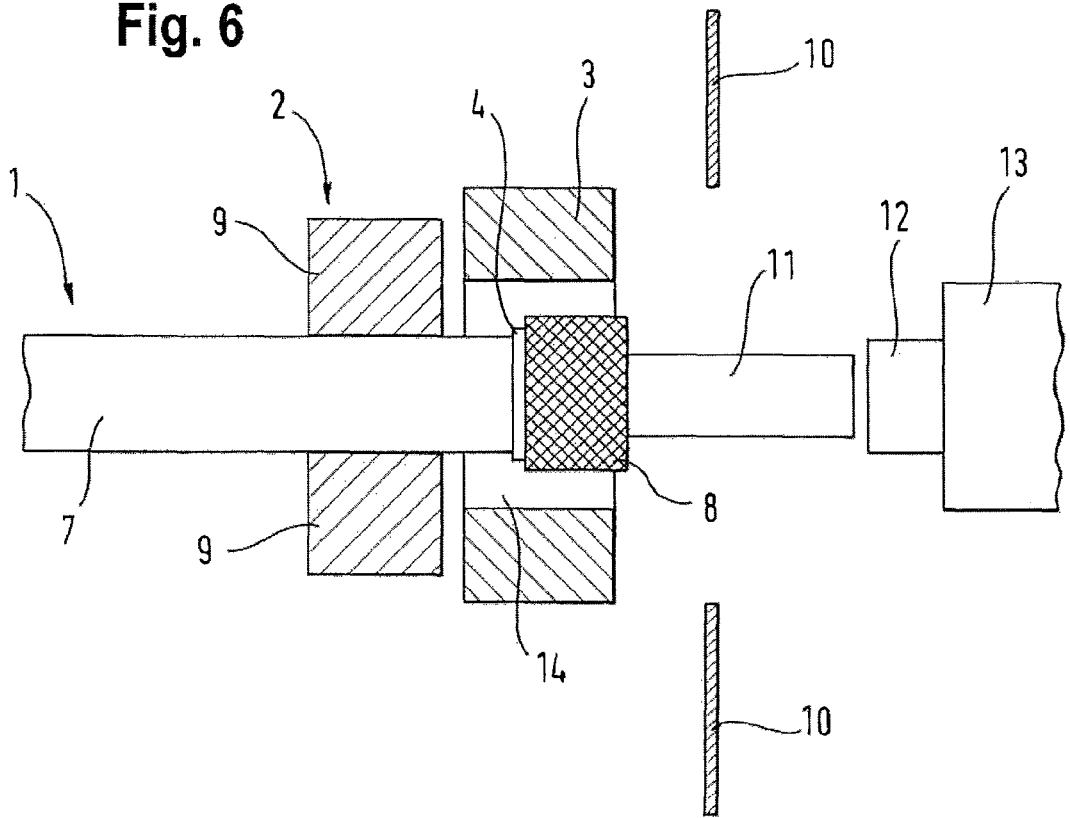
FIG. 6 depicts the first cutting tool of FIG. 5, including the foldback tube, being withdrawn.
Figure 7:
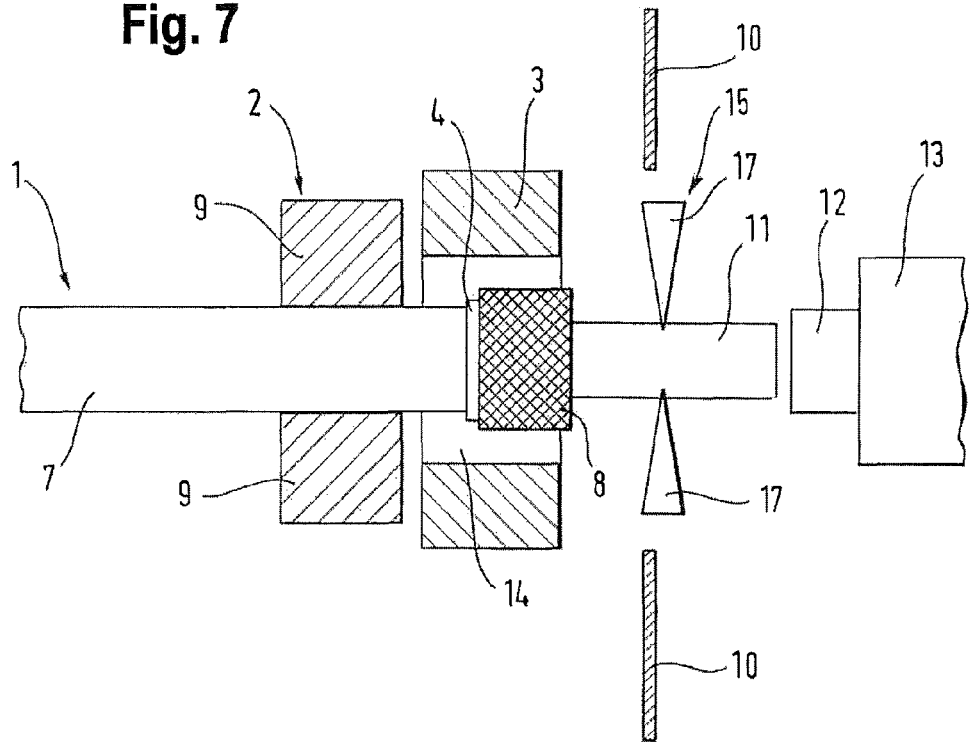
FIG. 7 depicts a severing device acting upon a section of an inner conductor of the coaxial cable of FIG. 6, exposing the inner conductor using cutting elements of the severing device, such that a circumferential cut is made in the insulating layer.

The first cutting tool 13 including the foldback tube 12 is then withdrawn (see FIG. 6).

Figure 8:
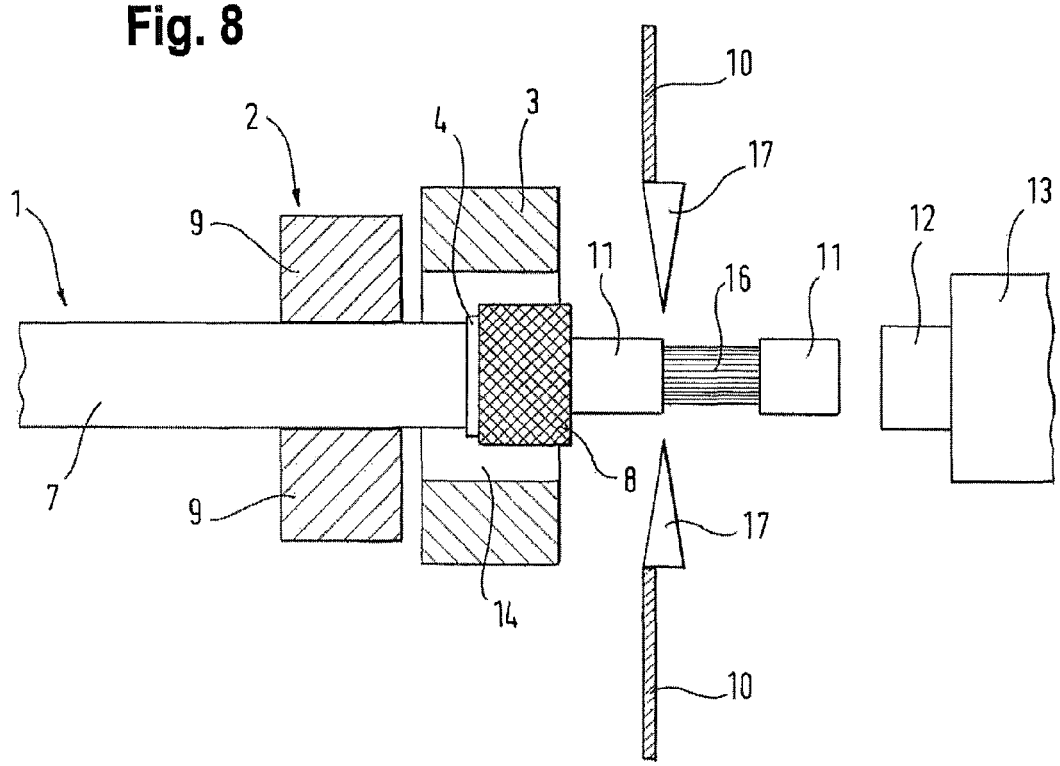
FIG. 8 depicts the insulating layer sleeve of FIG. 7 separated and pulled off the inner conductor in the direction of the free end of the coaxial cable.

Through the use of a severing device 15, a section of an inner conductor 16 of the coaxial cable 1 can then be exposed utilizing cutting elements 17 of the severing device 15, such that a circumferential cut is made in the insulating layer 11 (see FIG. 7) and the insulating layer sleeve separated in this way is pulled off the inner conductor 16 in the direction of the free end of the coaxial cable 1 (see FIG. 8). This can for example be effected through a corresponding movement of the severing device 15 which is still engaging in the insulating layer 11 or, again with the severing device 15 still engaging in the insulating layer 11, through a contrary movement of the coaxial cable 1, for example by means of the clamping device 2. An exposure of the outer conductor braid 8 can also be effected in the same way in that a section of the sheath 7 is removed by the severing device 15.

The coaxial cable 1 can then be removed and connected, for example, with a coaxial plug connector (not shown). For this purpose, an inner conductor part of the coaxial plug connector can for example be connected (for example crimped, soldered, welded, etc.) to the exposed section of the inner conductor 16 and an outer conductor part connected (for example crimped, soldered, welded, etc.) to the folded-back section of the outer conductor braid 8. The connection of the processed end of the coaxial cable can also take place automatically. It is also possible to further develop the device according to the invention in such a way that, after processing the cable end, this also carries out the connection with the coaxial plug connector.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A device for processing the end of a cable with an inner part and a sleeve surrounding the inner part, such that a section of the sleeve is radially widened, comprising:
    a foldback tube having a first end and a second end, and axially insertable into a gap between a radially widened section of the sleeve and the inner part for bending over said section of the sleeve;
    a cutting device for cutting the sleeve, having a first cutting body and a second cutting body, the cutting device being axially aligned with said foldback tube, said first cutting body in slidable mechanical communication with said foldback tube first end, and said second cutting body coaxial with said cable and proximate said foldback tube second end;
    a spring in mechanical communication with the foldback tube and the first cutting body of the cutting device in a spring-loaded manner, such that said spring is compressed when said first cutting body slidably traverses said foldback tube;
    wherein the foldback tube is insertable into the gap through an axial movement of the first cutting body until the foldback tube reaches an axial stop, and a further movement of the first cutting body takes place in a movement relative to the foldback tube; and
    wherein the first cutting body and the second cutting body are movable towards one another in the axial direction with respect to the cable end, thus severing the radially widened section of the sleeve in one region, the second cutting body having an opening, wherein the first cutting body penetrates into the opening of the second cutting body, cutting through the sleeve wherein the first cutting body and the second cutting body are movable towards one another in the axial direction with respect to the cable end, thus severing the radially widened section of the sleeve in one region, the second cutting body having an opening, wherein the first cutting body penetrates into the opening of the second cutting body, cutting through the sleeve.

2. The device of claim 1, wherein the first cutting body is tubular in form and slideable over the section of the cable adjacent the end which is to be processed, such that, following the severing action, the first cutting body folds back the remaining radially widened section of the sleeve.

3. The device of claim 1 wherein the axial stop is a supporting sleeve surrounding the cable, coaxially aligned and concentric with said second cutting body, and limiting the section which is to be radially widened.

4. The device of claim 3 including a nipper coaxially aligned with said second cutting body and located between said supporting sleeve and said end of said cable, said nipper presses the section of the sleeve which is to be radially widened locally into the inner part of the cable.

5. The device of claim 1 including a severing device coaxial with said second cutting body and located between said supporting sleeve and said end of said cable, and adjacent said nipper, said severing device moving radially inwards for severing an outer layer of the inner part and/or an outer layer of the outer part of the cable.

6. The device of claim 2 wherein the axial stop is a supporting sleeve, coaxially aligned and concentric with said second cutting body, surrounding the cable and limiting the section which is to be radially widened.

7. A method for the automated processing of an end of a cable with an inner part and a sleeve surrounding the inner part with a device according to claim 1, including radially widening one section of the sleeve, and severing the radially widened section of the sleeve in one region through the application of an axial cutting force.

8. The method of claim 7, including radial widening said section through the application of radial forces in a partial region of said section.

9. The method of claim 8, including bending over said section of the sleeve through the application of axial forces.

10. The method of claim 9, including removing an outer layer of the sleeve prior to the radial widening of an inner layer of the sleeve in the section of the sleeve which is to be radially widened.

11. The method of claim 7, including bending over said section of the sleeve through the application of axial forces.

12. The method of claim 7, including removing an outer layer of the sleeve prior to the radial widening of an inner layer of the sleeve in the section of the sleeve which is to be radially widened.

13. The method of claim 7, including removing an outer layer of the inner part from an inner layer of the inner part following a radial widening of the section of the sleeve, and exposing a corresponding section of the inner part.

14. The method of claim 7, including removing an outer layer of the inner part from an inner layer of the inner part following a radial widening of the section of the sleeve, and exposing a corresponding section of the inner part.

* * * * *